United States Patent [19]

Haines et al.

[11] Patent Number: 4,624,471
[45] Date of Patent: Nov. 25, 1986

[54] TRACTOR EARTH-TREATING IMPLEMENT CONNECTOR

[76] Inventors: Kenneth M. Haines, Rte. 1, Box 384 D; Thomas D. Oder, Rte. 1, Box 384 C, both of Belvidere, N.C. 27919; John E. Wood, III, Rte. 4, Box 179, Hertford, N.C. 27944

[21] Appl. No.: 762,074

[22] Filed: Aug. 2, 1985

[51] Int. Cl.[4] .......................................... A01B 49/06
[52] U.S. Cl. ................................ 280/411 R; 172/443
[58] Field of Search ............... 280/411 R, 411 C, 412; 172/443, 677

[56] References Cited

U.S. PATENT DOCUMENTS

| | | | |
|---|---|---|---|
| 2,785,614 | 3/1957 | Jensen | 97/46.27 |
| 3,177,828 | 4/1965 | Cramer | 111/52 |
| 3,314,386 | 4/1967 | Kopaska | 111/52 |
| 3,523,585 | 8/1970 | Godbersen | 172/456 |
| 3,528,507 | 9/1970 | Morkoski | 172/413 |
| 3,608,645 | 9/1971 | Meiners | 172/491 |
| 3,990,718 | 11/1976 | Holland | 280/412 |
| 4,015,549 | 4/1977 | Brown, Jr. | 111/8 |
| 4,227,581 | 10/1980 | Klotzbach | 172/142 |
| 4,433,735 | 2/1984 | Clark | 172/443 |
| 4,445,706 | 5/1984 | Jarosek | 280/411 C |
| 4,489,789 | 12/1984 | Pearce | 172/443 |

FOREIGN PATENT DOCUMENTS

| | | |
|---|---|---|
| 53475 | 9/1974 | Australia . |
| 2735366 | 8/1977 | Fed. Rep. of Germany . |
| 494136 | 2/1976 | U.S.S.R. . |

OTHER PUBLICATIONS

"Glencoe Danish Shank Field Cultivator with Double Rolling Baskets", 1/1980, Portable Elevator Division Dynamics Corp. of America, Bloomington, IL 61701.
"Announcing the SBC Cultivating System ... ", Kongskilde, Thames Road East, Box 880, Exeter, Ontario, 1/10/79.
"New Accessories from Tye", The Tye Company, Lockney, TX 79241, 12/1981.

Primary Examiner—John J. Love
Assistant Examiner—Donn McGiehan
Attorney, Agent, or Firm—Griffin, Branigan, & Butler

[57] ABSTRACT

A connector for connecting earth-treating implements to a tractor includes a slanted inverted U-shaped frame (12) having leading and trailing slanted upright sections (16 and 18) and a relatively level elevated mid-section (19) interconnecting the upright sections, with each of the upright sections having three-point hitches (20 and 22) mounted on the trailing sides thereof. The leading and trailing upright sections each comprise slanted upright posts (16a,16b and 18a,18b) at side edges thereof with horizontal posts (16c,16d and 18c,18d) mounted therebetween and vertically spaced from one another by about 24 inches to provide mounts for vertically spaced three-point hitch mounting members. The midsection (19) comprises two substantially level beams (56 and 58) extending between upper ends of the upright side posts of the upright sections (16 and 18). L-shaped frames (60 and 62) connected between the trailing upright posts (18a,18b) and the level mid-section beams (56 and 58) form wheel supports and provide a support cradle on which a sprayer tank (72) is carried. Liquid is sprayed from the tank by means of a metering mechanism activated by a cultivator's wheel rotation.

7 Claims, 5 Drawing Figures

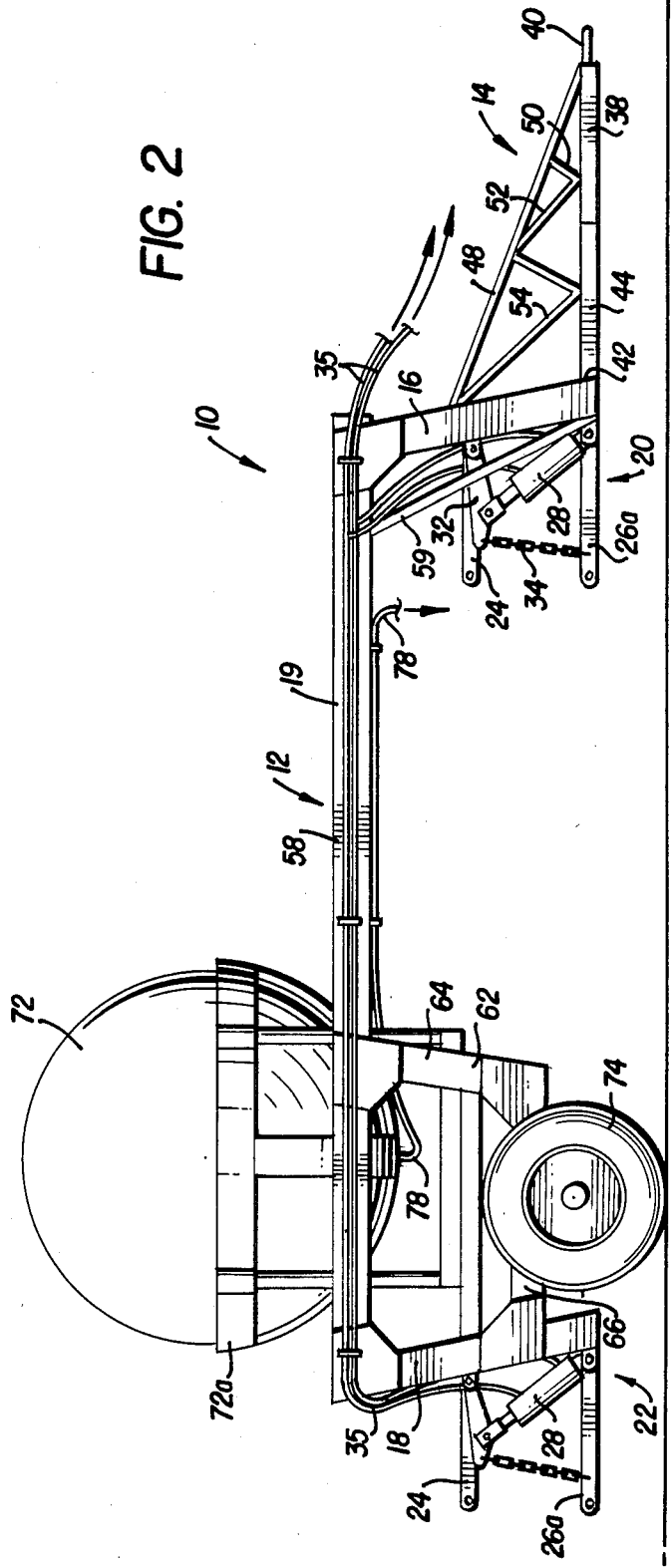
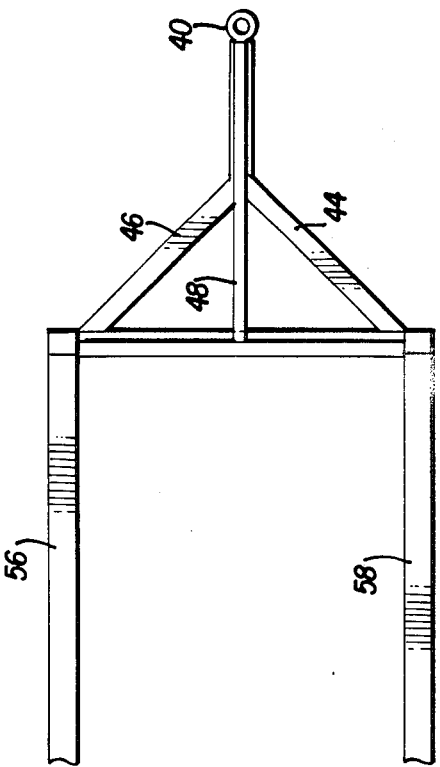
FIG. 2
FIG. 4

4,624,471

TRACTOR EARTH-TREATING IMPLEMENT CONNECTOR

BACKGROUND OF THE INVENTION

This invention relates generally to the art of farm machinery, and more specifically, to a connector which allows a tractor to tow a variety of implements for simultaneously carrying out serially acting, multiple earth-treating functions.

Farmers have long recognized the cost-savings benefits to be derived from simultaneously carrying out multiple earth-treating functions with single passes of tractors over fields. Toward this end, a number of devices have been utilized by farmers to allow them to pull two farm implements, one behind the other. One such device is sometimes referred to as a gooseneck hitch. A gooseneck hitch is normally coupled to a tractor at a relatively high vertical position, while an elevated neck thereof extends first rearwardly from the tractor coupling and then downwardly to wheels on which the gooseneck hitch rides to follow the tractor. An earth treating implement is then coupled to the gooseneck hitch at or behind the wheels while another earth-treating implement is attached to the tractor immediately behind the tractor under the elevated neck. A difficulty with the gooseneck hitch is that it normally requires a special adaptation for coupling the gooseneck hitch to the tractor. Further it requires that the tractor not only be attached to a gooseneck hitch, but also that it be attached to the immediately-following implement by means of a three-point hitch, thereby making preparation of the system somewhat difficult and limiting use of the tractor to some extent. Thus, it is an object of this invention to provide a tractor connector which can be used for pulling at least two earth-treating implements, one behind the other, which only requires a single, standard, universal coupling to a tractor, and in which the single coupling to the tractor is relatively easy to couple and decouple thereby increasing flexibility of use of the tractor.

U.S. Pat. No. 4,489,789 to Pearce discloses a tillage and planter carrier which is to be towed behind a tractor and which has a specially constructed tillage implement suspended from an upwardly arched portion of a main frame thereof while a three-point hitch thereof allows a seed planting machine to be detachably mounted at the trailing end thereof. Major disadvantages of this carrier are that it requires a special tillage implement and that it requires a special raising and lowering mechanism. Since it can only be used with this special tillage implement it offers little flexibility of use. Thus, it is an object of this invention to provide a tractor earth-treating implement connector which can be used to operate at least two earth-treating implements, one behind the other, which can be used with off-the-shelf implements, which does not require a special lifting mechanism and which can be used with virtually any earth-treating implement made for three-point hitches. Thus, it is an object of this invention to provide such a tractor earth-treating implement connector which does not require farmers to change farming practices they have previously used while allowing them to carry out pluralities of the same earth-treating procedures they have been using for years with a single pass of a tractor over their fields.

Another difficulty with the Pearce system is that it is rather complicated in structure, not only requiring the special lifting mechanisms previously mentioned, but also requiring a separate frame for mounting a three-point hitch at the trailing end thereof. Thus, it is an object of this invention to provide a tractor earth-treating implement connector which can be used to tow a plurality of earth-treating implements, one behind the other, in which an elongated frame extending from a coupling to wheels serves also as a mounting frame for leading and trailing three-point hitches.

Liquid-dispensing earth-treating implements (such as fertilizer and insecticide spreaders) have often been combined with earth tillage implements. There are many patented examples of this such as in U.S. Pat. No. 3,608,645 to Meiners in which liquid from a tank is dispensed at earth-digging tines. However, such uses have usually been limited to one earth-digging implement used in combination with a liquid-dispensing implement. It is therefore an object of this invention to provide an implement connector for allowing the use of a liquid-dispensing implement with two earth-digging implements, one being towed behind the other.

It is a further object of this invention to provide a tractor earth-treating implement connector which is relatively uncomplicated to manufacture and to use.

SUMMARY

According to principles of this invention, a tractor earth-treating implement connector comprises an elongated, slanted, inverted-U shaped, frame which can be attached to a tractor with a universal connection at a leading end thereof but which has leading and trailing upright sections joined by an elevated mid-section with three-point hitches mounted on trailing sides of the leading and trailing upright sections. The upright sections are formed of slanted upright side posts and level beams extending between the posts to form three-point hitch mounts. The mid-section comprises two substantially level beams extending between upper ends of the upright side posts. L-shaped frame members connected between the trailing slanted upright side posts and the level mid-section beams support wheels on which the connector rides and a cradle on which a liquid-dispenser earth-treating tank rides for dispensing liquid simultaneously with tillage of the earth by implements coupled to the leading and trailing three-point hitches.

BRIEF DESCRIPTION OF THE DRAWINGS

The foregoing and other objects, features, and advantages will be apparent from the following more particular description of a preferred embodiment of the invention, as illustrated in the accompanying drawings in which like reference characters refer to he same parts throughout the different views. The drawings are not necessarily to scale, emphasis instead being placed on illustrating principles of the invention in a clear manner.

FIG. 2 is a side view of the tractor earth-treating implement connector of FIG. 1 having a liquid holder sprayer tank mounted thereon along with hoses;

FIG. 4 is a simplified top view of the tongue of the implement of FIGS. 1 and 2.

DESCRIPTION OF THE PREFERRED EMBODIMENT

Figure 1:
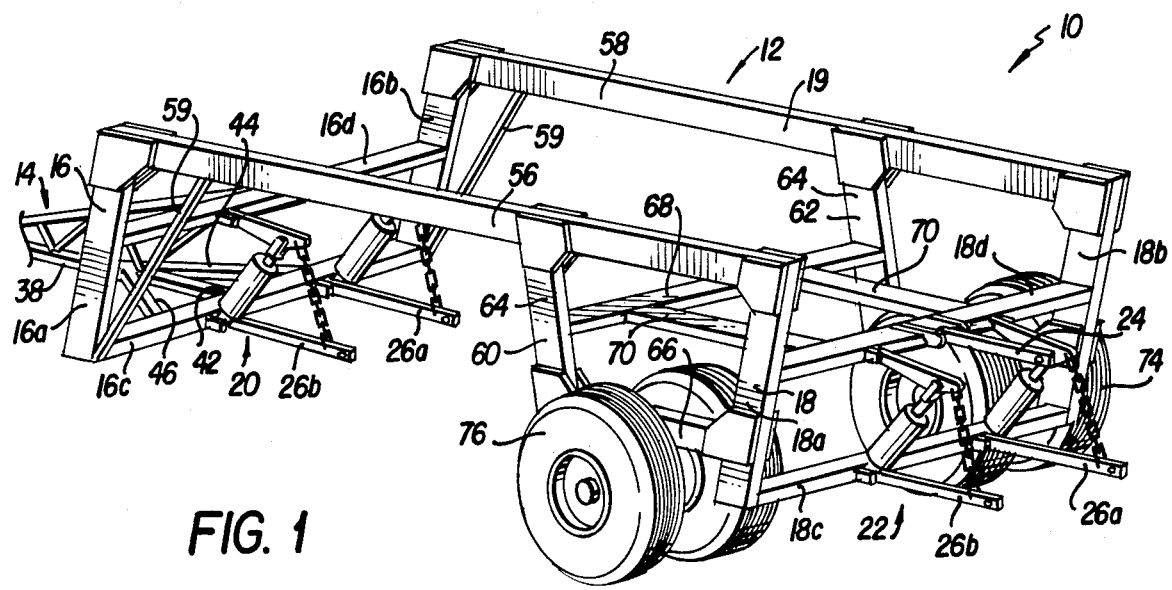
FIG. 1 is an isometric view of a tractor earth-treating implement connector of this invention with the front tip of its tongue being cut away.
Figure 3:
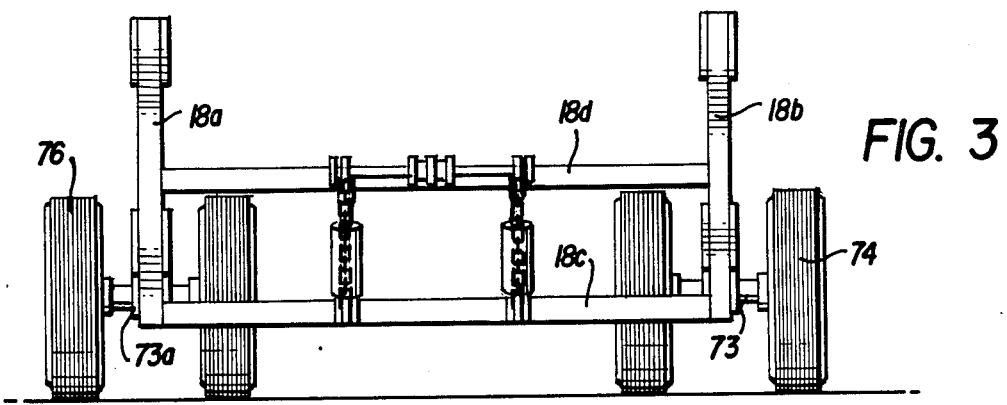
FIG. 3 is a simplified rear view of the structure of FIG. 2.
Figure 5:
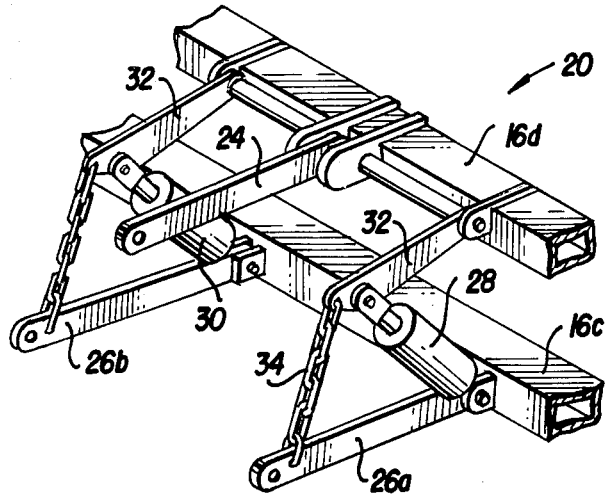
FIG. 5 is a simplified isometric view of the three-point hitch of the implement of FIGS. 1 and 2.

Looking now at the drawings, a tractor earth-treating implement connector 10 comprises an elongated frame 12 having basically a hitch tongue 14, a leading slanted upright section 16, a trailing slanted upright section 18, and an elevated, relatively level, mid-section 19 interconnecting the leading upright section 16 and the trailing upright section 18 at their upper ends.

Each of the leading upright section 16 and the trailing upright section 18 comprises a left-side upright-frame post 16a and 18a, a right-side upright-frame post 16b and 18b, a lower horizontal beam member 16c and 18c and upper horizontal beam member 16d and 18d. The lower and upper horizontal beam-member pairs 16c,16d and 18c,18d each extend between their respective side-upright frame-post pair 16a,16b and 18a,18b, with the horizontal beams of each pair being vertically spaced about 24 inches apart on center and the lower horizontal beams 16c,18c being about 18" above the ground. These spaced horizontal beam pairs 16c,16d and 18c,18d provide properly positioned mounts for a leading three-point hitch 20 and a trailing three-point hitch 22 which are mounted thereon. The slant to the vertical of the slanted upright posts 16a,16b and 18a,18b is proper for accommodating a three-point hitch. In this respect, each of the three-point hitches 20 and 22 comprises an upper parallel link 24 pivotally attached to the upper horizontal beam 16d,18d and two lower parallel links 26a and 26b attached to the lower horizontal beam 16c,18c. Each of the three-point hitches 20 and 22 includes two cylinder pistons 28 and 30 extending between the lower horizontal frame member 16c,18c and auxiliary links 32 which are coupled to the lower parallel links 26a and 26b by chains 34. The cylinder pistons 28 and 30 are operated hydraulically by hoses 35 which extend along the frame 12 to detachably couple with a standard hydraulic-tractor remote coupler on a tractor (not shown). Thus, by actuating the cylinder/pistons 30 and 32 of either the leading three-point hitch 20 or the trailing three-point hitch 22 the lower parallel links 26a and 26b thereof can be pivoted upwardly and downwardly remotely. Outer ends 36 of the upper parallel link 24 and the lower parallel links 26a and 26b are pivotally attached to a farm implement (not shown) at positions such that the upper and lower parallel links remain parallel to one another (a 24 inch spacing is the standard) during actuation of the cylinder pistons 28 and 30. By actuating the cylinder pistons 28 and 30 remotely the farm implements attached to the respective three-point hitches can be respectively raised and lowered.

The hitch tongue 14 comprises a main tongue member 38 having a universal hitch 40 at one end thereof and being attached to the lower horizontal beam 16c of the leading upright section 16 at its other end 42. The universal hitch 40 can be of a type for receiving a loose pin, a ball-and-socket type or any standard type of hitch which allows side-to-side pivotal movement and a certain amount of up-and-down pivotal movement. The main tongue member 38 is supported laterally by angle struts 44 and 46 which extend between sides of the main tongue member 38 and the lower horizontal beam 16c of the leading upright section 16. The main tongue member 38 is provided vertical support by an upwardly angled strut 48 extending between the upper surface of the main tongue member 38 and the leading side of the upper horizontal beam 16c with zig-zag braces 50, 52 and 54 being welded between the upwardly angled strut 48 and the main tongue member 38.

The relatively level mid-section 19 of the elongated frame 12 comprises two straight, essentially horizontal, beams 56 and 58 which respectively extend between the leading and trailing left and right side upright posts 16a,18a and 16b,18b. Struts 59 extend between each of the horizontal beams 56,58 and its respective leading upright post 16a,16b to provide additional rigidity for the leading upright section 16. The mid-section 19 is sufficiently elevated to allow a tillage implement to be positioned between it and the ground.

Extending between each of the left and right horizontal beams 56 and 58 and its adjacent trailing upright post 18a and 18b is an L-shaped frame 60,62, each comprising a wheel upright support 64 and a wheel horizontal support 66. Connected between the left and right wheel upright supports 64 is a first cradle member 68, and connected from the first cradle member 68, and extending horizontally therefrom to the trailing upper horizontal beam 18d, are second cradle members 70. These horizontal first and second cradle members 68 and 70, in conjunction with other frame members which have already been described, are for supporting the trailing upright section 18 and for holding a liquid tank 72, with its harness 72a, which contains fertilizer, insecticide or the like.

The leading upright section 16 is sufficiently forwardly spaced of the L-shaped frame 60 so as to allow a tillage implement to be used therebetween.

Each of the left and right wheel horizontal supports 66 has an axle 73 mounted by means of a rocker 73a thereon on which wheels carrying tire pairs 74 and 76 rotate. Thus, it can be seen that the tremendous weight of a liquid tank carried by the first and second cradle members 68 and 70, in conjunction with the remaining frame members, are easily supported directly above the tire pairs 74 and 76, without placing an undue load on the universal hitch 40 or on any of the farm implements attached to the leading and trailing three-point hitches 20 and 22.

A metering pump (not shown) mounted at a wheel (not shown) of a tillage implement attached to the leading three-point hitch 20 is driven by rotation of the wheel and thereby distributes liquids from liquid tank 72 via a hose 78 when the implement is towed on the ground to cause liquid to be dispensed from the hose 78 at tines of the tillage implement (not shown).

The frame members of the elongated frame 12 are stock, off-the-shelf, hollow steel beams having the following cross-sectional dimensions:

4"×7"—horizontal beams 58, wheel horizontal supports 66, upright and horizontal frame members 16a,b,c and d and 18a,b,c and d, wheel upright supports 64

4"×4"—main tongue member 38, axle 73, first and second bed members 68 and 70

2"×4"—upward-angled strut 48, zig-zag beams 50,52 and 54, struts 59

In operation, any of various farm implements having three-point hitch attachments could be connected to the leading and trailing three-point hitches 20 and 22. In this respect, one extremely practical use of the implement connector of this invention is that of secondary tillage to include a bed preparer at the leading three-point hitch 20, a planter at the trailing three-point hitch 22, and a pressurized liquid tank 72 to dispense liquid fertilizer at the ground-breaking elements of the bedder. The bedder could be an S-tine bedder, a field cultivator, a bed shaper, or any other bedder accepting a three-point hitch. Likewise, the planter could be any of various planters accepting a three-point hitch—such as grain drills or corn and vegetable planters. By using this arrangement, once a field has been disced, a farmer can, with one sweep over his field, prepare a bed, fertilize the bed and plant seed. In this respect, once the farmer has attached the proper implements at the leading and trailing three-point hitches 20 and 22, he attaches a universal coupling of his tractor to the universal hitch 40 and couples the standard hydraulic-tractor remote coupler (not shown) on his tractor to control hoses 35 extending to the cylinder/pistons 28 and 30 of both three-point hitches 20 and 22. As the farmer tows the implement connector 10 over his field, with its hitched implements, he can control operation of the implements by operating the leading and trailing three-point hitches 20 and 22 with valves on his tractor. Thus, for example, when he gets to the end of a row, to avoid breaking ground beyond the row, he can lift the bedder by using the leading three-point hitch 20 while leaving the planter of the trailing three-point hitch 22 in operation to complete planting the row. Once planting of the row is completed, he lifts the planter also to avoid wasting seeds outside of the row. When the operator lifts the bedder using the leading three-point hitch 20, the liquid tank 72 automatically stops dispensing fertilizer via a hose 80 since the metering pump (not shown) in hose 78 is no longer driven from a wheel (not shown) on the bedder (not shown).

Once an operator has prepared and planted a field in one sweep, it is not necessary that he detach the bed preparer and planter from the leading and trailing three-point hitches 20 and 22 of the implement connector 10, unless he wishes to use the connector with yet other implements, but rather, he need only unhitch the tractor from the connector 10 at the universal hitch 40, thereby freeing the tractor for other uses. Thus, use of the tractor is given more flexibility because it can be quickly attached and detached to and from necessary planting and tilling implements.

It will be understood by those skilled in the art that the connector of this invention does not unduly tie up a tractor and thereby reduces the time spent by farmers attaching and detaching farm implements to and from tractors. One major advantage of this invention is, by going over a field only once rather than three times with a tractor, ground compacting of a field is reduced.

One tremendous benefit of this invention is that the implement connector can be used with off-the-shelf farm tillage instruments which normally have connections for three-point hitches, thus, the connector is relatively inexpensive to both build and use because it is not necessary to develop new equipment for the connector or to be used with the connector.

But equally important is the fact that this connector not only allows the use of tandem ground tillage instruments, one behind the other, but also provides for the distribution of liquid materials onto the ground in conjunction therewith by providing an appropriate cradle for carrying a pressurized liquid tank. A user can pull two, three-point hitch implements while also applying fertilizer or herbicides with one power source.

While the invention has been particularly shown and described with reference to a preferred embodiment, it will be understood by those skilled in the art that various changes in form and detail may be made therein without departing from the spirit and scope of the invention. For example, liquid could be dispensed from the liquid tank 72 to a planting implement attached to the trailing three-point hitch 22.

The fact that leading and trailing three-point hitches are attached directly to trailing sides of vertical upright sections of the inverted U-shaped frame provide tremendous advantages in simplicity of construction and use of the invention.

The embodiments of the invention in which an exclusive property or privilege are claimed are defined as follows:

1. A tractor earth-treating implement connector of a type for allowing a tractor to simultaneously operate a plurality of earth-treating implements, said connector comprising:

a towing hitch means for attaching said earth-treating implement connector to a prime-moving tractor for allowing said prime-moving tractor to tow said connector and attached earth-treating implements over earth to be treated;

an elongated rigid frame attached to said towing hitch means, said elongated rigid frame comprising at a leading end thereof a leading, substantially upright, section attached to said towing-hitch means, at a trailing end thereof, a trailing, substantially upright, section, and at a mid-section thereof an elevated, relatively level, section interconnecting upper end portions of said leading and trailing upright sections whereby said elongated rigid frame forms an inverted U-shape when viewed from its side with an open space formed between the leading and trailing upright sections, said leading upright section thereof including fixed supports integral therewith positioned and dimensioned for allowing a first remote-controlled three-point hitch to be mounted on the trailing side thereof for attachment to, and operation of, an earth-treating implement in said open area between said leading and trailing upright sections, said trailing upright section having attached thereto fixed supports positioned and dimensioned for allowing a second remote-controlled three-point hitch to be mounted at the trailing end of said connector for allowing a remote-controlled three-point hitch to be mounted at the trailing end of said connector for attachment to and operation of an earth-treating implement trailing said connector; and, first and second remotely operable three-point hitches respectively mounted to said fixed support on the trailing side of said leading upright section and at the trailing end of said connector;

said leading upright section of said elongated frame comprising left and right side upright posts positioned at the sides thereof, and an upper horizontal beam extending between said left and right side upright posts, said first three-point hitch having lower parallel links pivotally coupled to said leading upright section at an approximate level of said towing hitch means during normal operation thereof, and an upper parallel link pivotally coupled to said upper horizontal beam which is located approximately 24 inches above the connections of said lower parallel links to said leading upright section;

whereby said connector, with its first and second three-point hitches can be readily connected to at least two earth-treating implements chosen from a variety of off-the-shelf earth-treating implements made for operation with three-point hitches for simultaneously towing the earth-treating implements, one behind the other and controlling vertical movement of the implements remotely from said tractor.

2. A tractor earth-treating implement connector as in claim 1 wherein said leading upright section of said elongated frame further comprises a lower horizontal elongated beam extending between said left and right side upright posts, said lower and upper horizontal elongated beams being spaced from one another a distance of approximately 24 inches, said lower and upper parallel links being pivotally coupled to said lower and upper horizontal elongated beams.

3. A tractor earth-treating implement connector as in claim 2 wherein said trailing upright section is comprised of right and left side upright posts having upper and lower horizontal elongated beams extending therebetween, said upper and lower horizontal elongated frame members being laterally spaced one from the other approximately 24 inches, said second three-point hitch having parallel links pivotally coupled to said lower and upper horizontal elongated beams.

4. A tractor earth-treating implement connector as in claim 3 wherein the right and left upright elongated posts of said leading and trailing upright sections are interconnected by parallel substantially horizontal beams of the mid-section of said frame and wherein is further included an L-shaped frame connected between each of said substantially horizontal beams and its adjacent trailing upright elongated post so as to form a wheel horizontal support, and a rotatable wheel mounted on said wheel horizontal support for contacting the ground to support said implement connector.

5. A tractor earth-treating implement connector as in claim 4 wherein horizontal cradle members extend between said L-shaped frame and the trailing upright section to form a cradle for supporting a liquid tank; and a liquid tank supported by said cradle and including means for dispensing liquid from said tank onto the earth.

6. A tractor earth-treating implement connector as in claim 1 wherein said second three-point hitch is attached directly to said trailing upright section.

7. A tractor earth-treating implement connector as in claim 1 wherein is further included a liquid tank on said implement connector including a means for spraying liquid from said tank onto the earth during towing of the implement connector.

* * * * *